United States Patent
Lakhani et al.

(10) Patent No.: US 8,027,334 B2
(45) Date of Patent: *Sep. 27, 2011

(54) METHOD AND SYSTEM FOR MULTIMEDIA MESSAGING SERVICE (MMS) RATING AND BILLING

(75) Inventors: Shailesh Lakhani, Mississauga (CA); Jacky Chan, Toronto (CA)

(73) Assignee: RedKnee, Inc., Mississauga (CA)

( * ) Notice: Subject to any disclaimer, the term of this patent is extended or adjusted under 35 U.S.C. 154(b) by 393 days.

This patent is subject to a terminal disclaimer.

(21) Appl. No.: 12/205,422

(22) Filed: Sep. 5, 2008

(65) Prior Publication Data
US 2008/0318603 A1    Dec. 25, 2008

Related U.S. Application Data

(63) Continuation of application No. 10/461,485, filed on Jun. 16, 2003, now Pat. No. 7,440,441.

(51) Int. Cl.
*H04L 12/66* (2006.01)
*H04L 12/28* (2006.01)
*G06F 15/173* (2006.01)
*H04M 11/00* (2006.01)

(52) U.S. Cl. ........ 370/352; 370/351; 370/229; 370/237; 370/356; 370/395.52; 370/401; 370/406; 709/224; 455/408; 455/414.1; 455/406; 455/503; 455/509

(58) Field of Classification Search .......... 370/218–503; 709/205–248; 455/406–408, 414.1, 503–509
See application file for complete search history.

(56) References Cited

U.S. PATENT DOCUMENTS

| | | | |
|---|---|---|---|
| 6,473,622 B1 | 10/2002 | Meuronen | |
| 6,473,794 B1 * | 10/2002 | Guheen et al. | 709/223 |
| 6,536,037 B1 * | 3/2003 | Guheen et al. | 717/151 |
| 6,611,875 B1 | 8/2003 | Chopra et al. | |
| 6,615,166 B1 * | 9/2003 | Guheen et al. | 703/27 |
| 6,615,262 B2 | 9/2003 | Schweitzer et al. | |
| 6,621,793 B2 | 9/2003 | Widegren et al. | |
| 6,661,780 B2 | 12/2003 | Li | |
| 6,667,780 B2 | 12/2003 | Cho | |
| 6,714,515 B1 | 3/2004 | Marchand | |
| 6,718,380 B1 | 4/2004 | Mohaban et al. | |
| 6,721,713 B1 * | 4/2004 | Guheen et al. | 705/1.1 |
| 6,775,267 B1 * | 8/2004 | Kung et al. | 370/352 |

(Continued)

FOREIGN PATENT DOCUMENTS

DE    101 48 540 A1    10/2001

(Continued)

OTHER PUBLICATIONS

Dippelhofer: *"Flexible Abrechnung"*, Wireless LAN, XP-001164781, Un 0202, Po 17-01-2003, p. 34-36 (no English version available).

(Continued)

*Primary Examiner* — Ayaz Sheikh
*Assistant Examiner* — Venkatesh Haliyur
(74) *Attorney, Agent, or Firm* — Martin & Ferraro, LLP

(57) ABSTRACT

The advances disclosed herewith delimit an improved method and system for smoothly rating and billing Multimedia Messaging Service (MMS). Implemented as part of a computer program product, the solution seeking the protection of Letters Patent, represents a comprehensive real-time solution for rating incoming and outgoing MMS messages which, with a view towards simplicity and efficacy of purpose, enables wireless/mobile subscribers to maintain a single account for both voice and messaging (MMS) services.

17 Claims, 1 Drawing Sheet

U.S. PATENT DOCUMENTS

| | | | |
|---|---|---|---|
| 6,785,534 | B2 | 8/2004 | Ung |
| 6,847,708 | B1 | 1/2005 | Abbasi et al. |
| 6,891,811 | B1 | 5/2005 | Smith et al. |
| 6,895,235 | B2 | 5/2005 | Padgett et al. |
| 6,947,531 | B1 | 9/2005 | Lewis et al. |
| 7,003,307 | B1 | 2/2006 | Kupsh et al. |
| 7,039,037 | B2 | 5/2006 | Wang et al. |
| 7,107,068 | B2 | 9/2006 | Benzon et al. |
| 7,139,387 | B2 | 11/2006 | Dahari |
| 7,194,235 | B2 * | 3/2007 | Nykanen et al. ............ 455/3.01 |
| 7,215,970 | B2 | 5/2007 | Corrigan et al. |
| 7,269,431 | B1 | 9/2007 | Gilbert |
| 7,272,133 | B2 | 9/2007 | Valin et al. |
| 7,302,254 | B2 * | 11/2007 | Valloppillil ................ 455/414.1 |
| 7,315,826 | B1 * | 1/2008 | Guheen et al. ............... 705/7.29 |
| 7,340,214 | B1 * | 3/2008 | Hamberg ..................... 455/41.2 |
| 7,440,441 | B2 * | 10/2008 | Lakhani et al. ............... 370/352 |
| 7,457,865 | B2 * | 11/2008 | Ramakrishnan et al. ..... 709/224 |
| 7,564,840 | B2 * | 7/2009 | Elliott et al. .................. 370/356 |
| 7,644,158 | B2 * | 1/2010 | Ramakrishnan et al. ..... 709/224 |
| 2001/0026553 | A1 | 10/2001 | Gallant et al. |
| 2001/0053687 | A1 | 12/2001 | Sivula |
| 2001/0055291 | A1 | 12/2001 | Schweitzer |
| 2002/0052754 | A1 | 5/2002 | Joyce et al. |
| 2002/0103925 | A1 | 8/2002 | Sheth et al. |
| 2002/0107754 | A1 | 8/2002 | Stone |
| 2002/0126701 | A1 | 9/2002 | Requena |
| 2002/0152319 | A1 | 10/2002 | Amin et al. |
| 2002/0152321 | A1 | 10/2002 | Le et al. |
| 2002/0176378 | A1 | 11/2002 | Hamilton et al. |
| 2003/0003932 | A1 | 1/2003 | Corrigan et al. |
| 2003/0035409 | A1 | 2/2003 | Wang et al. |
| 2003/0051041 | A1 | 3/2003 | Kalavade et al. |
| 2003/0069922 | A1 * | 4/2003 | Arunachalam ............... 709/203 |
| 2003/0074286 | A1 | 4/2003 | Rodrigo |
| 2003/0083990 | A1 | 5/2003 | Berg et al. |
| 2003/0096605 | A1 | 5/2003 | Schlieben et al. |
| 2003/0105720 | A1 | 6/2003 | Ishibashi |
| 2003/0105864 | A1 | 6/2003 | Mulligan et al. |
| 2003/0112936 | A1 | 6/2003 | Brown et al. |
| 2003/0134615 | A1 | 7/2003 | Takeuchi |
| 2003/0157925 | A1 | 8/2003 | Sorber et al. |
| 2003/0158902 | A1 * | 8/2003 | Volach ........................ 709/206 |
| 2003/0187996 | A1 | 10/2003 | Cardina et al. |
| 2003/0207686 | A1 | 11/2003 | Ramanna et al. |
| 2003/0214958 | A1 | 11/2003 | Madour et al. |
| 2004/0022191 | A1 | 2/2004 | Bernet et al. |
| 2004/0028055 | A1 | 2/2004 | Madour et al. |
| 2004/0066769 | A1 | 4/2004 | Ahmavaara et al. |
| 2004/0092250 | A1 * | 5/2004 | Valloppillil ................ 455/412.1 |
| 2004/0092272 | A1 * | 5/2004 | Valloppillil .................. 455/466 |
| 2004/0095924 | A1 | 5/2004 | Holur et al. |
| 2004/0105424 | A1 | 6/2004 | Skoczkowski et al. |
| 2004/0117312 | A1 * | 6/2004 | Lialiamou et al. ............ 705/52 |
| 2004/0127215 | A1 * | 7/2004 | Shaw ........................ 455/432.1 |
| 2004/0236686 | A1 | 11/2004 | Bohmer et al. |
| 2005/0002407 | A1 * | 1/2005 | Shaheen et al. ............... 370/401 |
| 2005/0100035 | A1 | 5/2005 | Chiou et al. |
| 2005/0131984 | A1 | 6/2005 | Hofmann et al. |
| 2005/0185661 | A1 * | 8/2005 | Scott et al. ..................... 370/401 |
| 2005/0185664 | A1 | 8/2005 | Chaskar et al. |
| 2005/0195743 | A1 | 9/2005 | Rochberger et al. |
| 2005/0272465 | A1 | 12/2005 | Ahmavaara et al. |
| 2006/0008063 | A1 | 1/2006 | Harnesk et al. |
| 2006/0028980 | A1 | 2/2006 | Wright |
| 2006/0031297 | A1 * | 2/2006 | Zuidema ..................... 709/206 |
| 2006/0034281 | A1 | 2/2006 | Cain et al. |
| 2006/0039374 | A1 | 2/2006 | Belz et al. |
| 2006/0072595 | A1 | 4/2006 | Broberg et al. |
| 2006/0075467 | A1 | 4/2006 | Sanda et al. |
| 2008/0013531 | A1 * | 1/2008 | Elliott et al. .................. 370/356 |

FOREIGN PATENT DOCUMENTS

| | | |
|---|---|---|
| EP | 1 026 853 A1 | 8/2000 |
| EP | 1 278 359 A2 | 1/2003 |
| EP | 1 278 383 A | 1/2003 |
| EP | 1 298 599 A1 | 4/2003 |
| EP | 1 309 213 A | 5/2003 |
| EP | 1 320 214 A1 | 6/2003 |
| EP | 1 278 359 A3 | 6/2004 |
| EP | 1 278 359 B1 | 3/2007 |
| WO | WO 00/16891 | 3/2000 |
| WO | WO 01/63883 A2 | 8/2001 |
| WO | WO 01/69891 A1 | 9/2001 |
| WO | WO 03/032618 A1 | 4/2003 |
| WO | WO 03/037023 A1 | 5/2003 |
| WO | WO 03/047164 A | 6/2003 |
| WO | WO 03/047164 A2 | 6/2003 |
| WO | WO 2007/138407 A2 | 12/2007 |

OTHER PUBLICATIONS

European Search Report for EP 04076726.1-2414 completed Nov. 4, 2004 by M. Kahl in Munich.

EPO Office Action for corresponding EP04076726.1-2414 dated Mar. 16, 2006; Attached.

Yi-Bin Lin et al.: "*Mobile Prepaid Phone Services*"; XP011092391; IEEE Personal Communications; Jun. 2000; pp. 6-14.

Mohamed Ganna et al.: "*On Using Policies for Managing Service Provisioning in Agent-Based Heterogenous Environments for Mobile Users*"; Universite Pierre et Marie Curie; Proceedings of the sixth IEEE International Workshop on Policies for Distributed Systems and Networks Jun. 6-8, 2005; pp. 149-158.

Apostolis Salkintzis: "*Seamless Multimedia QoS Across UMTS and WLANs*"; IEEE 61$^{st}$ Vehicular Technology Conference, VTC, May 30-Jun. 1, 2005; vol. 4, pp. 2284-0088.

Michael Cheung et al.: "*Applying a Service-on-Demand Policy Management Framework to an ETTx Environment*"; IEEE/IFIP Network Operations and Management Symposium, 2004, NOM 2004, Apr. 19-23, 2004, vol. 2, pp. 101-114.

D. Fonknechten et al.: "*Service Aware Intelligent GGSN*"; Alcatel Telecommunications Review, No. Q4 2003, Oct. 1, 2003, pp. 1-10.

3GPP TS 23.203 V7.4.0—"3$^{rd}$ Generation Partnership Project: Technical Specification Group Services and System Aspects; Policy and Charging Control Architecture" (release 7) Sep. 26, 2007; retrieved from the internet http://www.3gpp.org/ftp/Specs/archive/23_series/23.203/23203-740.zip pp. 11-30, 42, 47-48, 58-59.

* cited by examiner

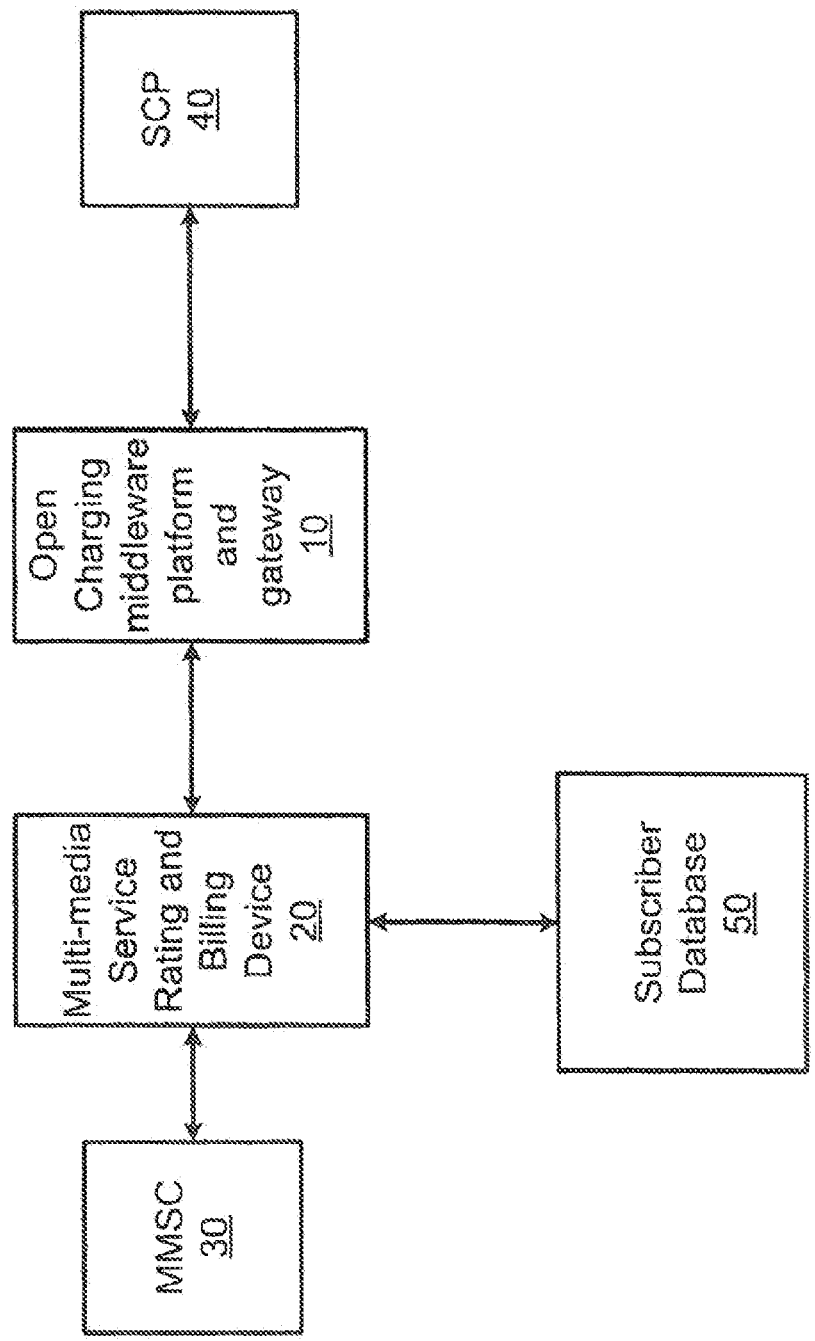

METHOD AND SYSTEM FOR MULTIMEDIA MESSAGING SERVICE (MMS) RATING AND BILLING

CROSS-REFERENCE TO RELATED APPLICATIONS

The present invention is a continuation application from U.S. patent application Ser. No. 10/461,485, filed Jun. 16, 2003 now U.S. Pat. No. 7,440,441; which is related to patent application Ser. No. 10/307,335 entitled "Improved method for implementing an Open Charging (OC) middleware platform and gateway system".

STATEMENT REGARDING FEDERALLY SPONSORED RESEARCH OR DEVELOPMENT

Not Applicable

REFERENCE TO A MICROFICHE APPENDIX

Not Applicable

BACKGROUND ART

Owing to the contemporary nature of Multimedia Messaging Services (MMS), the art directed at its rating and billing remains very much in its infancy, and in particular to real-time solutions developed in this regard. Consider US Patent Application No. 20010053687 by Sivula, entitled Method for addressing billing in a message service, messaging service system, server and terminal discloses art related to a method for addressing billing in a multimedia messaging service applying store-and-automatic forward messaging. However, the application by Sivula concerns a zero charge for the retrieval of a MMS message to a destination number. Sivula's application does not intimate or cover the rating and charging of the origination of a MMS message by a wireless subscriber, which remains a principal crux of our invention of present.

REFERENCES CITED

U.S. patent application

| | | | |
|---|---|---|---|
| 20010053687 | December 2001 | Sivula | 455/412 |

TECHNICAL FIELD

The present invention relates generally to telecommunication network implementations and billing systems; and in particular, to an improved method and system for Multimedia Messaging Service (MMS) rating and billing.

SUMMARY OF THE INVENTION

The invention disclosed provides for an improved method and system for smoothly rating and billing Multimedia Messaging Service (MMS). Articulated as part of a computer program product, the art incorporates a real-time, flexible rating engine, which can non-limitingly provide for the rating of such Multimedia Messaging Services based on subscriber and service variables, messaging type, origination/termination type, on/off-Net differentiation, content, size, quantity, duration, time of day/buckets/free transactions, configured promotions. The logic of the art has also been refined and adapted to include the ability to block MMS based on account threshold.

The invention interacts with the relevant Service Control Point (SCP) through an Open Charging (OC) middleware platform and gateway system as detailed in patent application Ser. No. 10/307,335 (or similar intermediating telecommunications network implementations, technologies, platforms, and/or gateways may be employed without diluting the intended result or elucidation of the art).

BRIEF DESCRIPTION OF THE DRAWINGS

FIG. 1 illustrates a typical, non-limiting embodiment of the system level architecture employed in the disclosure of present;

DETAILED DESCRIPTION OF THE PREFERRED EMBODIMENTS

The improved method and system for Multimedia Messaging Service (MMS) rating and billing disclosed herewith offers members skilled in the art of telecommunication network operation and intermediation an innovative mechanism for real-time rating and charging for MMS messages. (Both Mobile Originated (MO) and Mobile Terminated (MT) messages are encompassed by elements of the application).

With reference now to FIG. 1, the improved method and system for Multimedia Messaging Service (MMS) rating and billing 20 in particular is juxtaposed and remains contingent upon, in the preferred embodiment, an Open Charging (OC) middleware platform and gateway system 10 as detailed in patent application Ser. No. 10/307,335, for mediation with a prepaid or postpaid platform. Noble technicians skilled in the art will recognize that the invention of present need not be limited to the aforementioned Open Charging (OC) middleware platform and gateway system and other similar network implementations may be employed without diluting the intent and scope as such. However, to facilitate ease of instruction and overall efficacy of purpose the recourse to the Open Charging (OC) middleware platform and gateway system 10 is expressly invoked and relied upon.

Furthermore, to facilitate the instruction of the art, the improved method and system for Multimedia Messaging Service (MMS) rating and billing 20 disclosed herewith interfaces with the Multimedia Messaging Service Center's (MMSC) 30 Real Time Payment Protocol (RTPP) interface for real-time Mobile Originated MMS rating and charging. The invention 20, which is articulated as part of computer program product, accepts RTPP triggers from a MMSC 30 and subsequently rates, and charges messaging traffic against the Open Charging (OC) middleware platform and gateway system 10. Technicians skilled in the art will recognize that the invention of present need not be limited to the aforementioned Open Charging (OC) middleware platform and gateway system and other similar network implementations may be employed without diluting the intent and scope as such. Technicians skilled in the art will also recognize that any number of protocols, triggers and interfaces may be employed herewith, and indeed, remain only bound by the state of the art and the reference to any one protocol (or similar rules, methods and means for the transmission of data) remains purely for the purposes of simplicity and ease of instruction, and do not serve to dilute the application and scope of the invention as such.

In alternate embodiments, the invention 20, may also access an external Lightweight Directory Access Protocol (LDAP) subscriber database 50 for subscriber profile queries. Technicians skilled in the art will also recognize that the triggers, protocols and like commands used among the network elements remain only bound by the state of the art and do not serve to dilute the generality of such interaction.

The MMSC 30 initiates connections to the improved method and system for Multimedia Messaging Service (MMS) rating and billing 20; and therewith once the connection has been established, the MMSC 30 performs transactions by submitting requests to the requisite logic of the disclosed invention 30.

In the preferred embodiment, the computer program product which implements the invention 20 disclosed herewith has been articulated with particular 'fail-safe' logic. Indeed, wherever the improved method and system for Multimedia Messaging Service (MMS) rating and billing 20 is invoked it attempts to connect to the external LDAP subscriber database 50. In the event the connection is lost, the node implementing the invention 20 will reattempt the connection at periodic intervals for a configurable number of times. Where re-connection remains unrealized, the improved method and system for Multimedia Messaging Service (MMS) rating and billing 20 will instinctively switch to one of the following configurable modes. In "reject" mode, all incoming RTPP triggers will be rejected immediately until connection is re-established. Connection attempts are performed at periodic intervals. In "passthrough" mode, all incoming RTPP triggers will be successfully acknowledged immediately until connection is re-established. Connection attempts are performed at periodic intervals. When a connection is broken, an SNMP trap will be raised. Once the connection is re-established, another SNMP trap is generated to clear the alarm.

At the core of the invention 20 remains the rating engine and the logic, routines and rules used therewith, articulated to provide real-time, high performance rating for MMS messages. The Rating Rule definition allows a member skilled in the art to determine the rate for each MMS. In the preferred embodiment, rules are to be considered in order. The first rule that matches a given MMS Event will be used and remaining rules will be ignored. Where no rules match, the MMS will be assumed to be free of charge. No charging will occur.

The member skilled in the art may insert, change and delete rules as they deem appropriate. For ease of reference, the following table (Table 1) seeks to outline the rating rule architecture in a non-limiting, illustrative manner.

TABLE 1

Rating Rule Architecture

| Title | Description |
|---|---|
| Rule # | The Rule #. Rules are processed in this order, starting from 1 increasing to DEF. |
| SPID | The Service Provider this rule belongs to. Required for MSP compliance |
| Originating Rate Plan | The Rate Plan of the Originating subscriber. |
| Originating MSISDN | The source address of the incoming message. Both exact matching and prefix matching supported. |
| Terminating Rate Plan | The Rate Plan of the Terminating subscriber |
| Terminating MSISDN | The destination address of the incoming message. Both exact matching and prefix matching supported. |
| Min Volume | The minimum volume, based on number of bytes, that the rule applies. |
| Max Volume | The maximum volume, based on number of bytes, that the rule applies. Use '*' to indicate no upper limit. |

TABLE 1-continued

Rating Rule Architecture

| Title | Description |
|---|---|
| Day | The day that this rule applies. This can be one of: Monday, Tuesday, Wednesday, Thursday, Friday, Saturday, Sunday, Weekdays (Mon-Fri), Weekends (Sat, Sun), Holidays (see Holiday table), Everyday (week) |
| Start Time | The Start Time, based on SMSC time, that the rule applies |
| End Time | The End Time, based on SMSC time, that the rule applies |
| Start Date | The date the rule is effective. The rule will be considered as effective on or following this day. |
| Orig Rate | The rate charged to the originating MSISDN. |
| Term Rate | The rate charged to the terminating MSISDN. |

The invention 20 interfaces with an Open Charging (OC) middleware platform and gateway system 10 as detailed in patent application Ser. No. 10/307,335, for mediation with the wireless subscriber's prepaid account in performing the requisite balance deduct function. Noble technicians skilled in the art will recognize that the invention of present need not be limited to the aforementioned Open Charging (OC) middleware platform and gateway system and other similar network implementations for balance deductions may be employed without diluting the intent and scope as such.

Additionally, when handling group messages, the invention 20 interfaces with an Open Charging (OC) middleware platform and gateway system 10 as detailed in patent application Ser. No. 10/307,335, to query the balance of the wireless subscriber's prepaid account. Noble technicians skilled in the art will recognize that the invention of present need not be limited to the aforementioned Open Charging (OC) middleware platform and gateway system and other similar network implementations for balance queries may be employed without diluting the intent and scope as such.

Much like the 'fail-safe' scenario outlined prior (in regards to the external LDAP subscriber database 50), wherever the invention 20 is invoked the art therewith attempts to connect to the Open Charging (OC) middleware platform and gateway system 10. In the event the connection is lost, the node implementing the invention 20 will reattempt the connection at periodic intervals for a configurable number of times. Where re-connection remains unrealized, the improved method and system for Multimedia Messaging Service (MMS) rating and billing 20 will instinctively switch to one of the following configurable modes. In "reject" mode, all incoming RTPP triggers will be rejected immediately until connection is re-established. Connection attempts are performed at periodic intervals. In "passthrough" mode, all incoming RTPP triggers will be successfully acknowledged immediately until connection is re-established. Connection attempts are performed at periodic intervals. When a connection is broken, an SNMP trap will be raised. Once the connection is re-established, another SNMP trap is generated to clear the alarm. Technicians skilled in the art will recognize that the invention of present need not be limited to the aforementioned Open Charging (OC) middleware platform and gateway system and other similar network implementations for balance queries may be employed without diluting the intent and scope as such.

Another singular aspect of the invention of present, remains the ability to rate and charge for Group Messages. A Group Message is defined as an MMS message addressed to multiple recipients. In the all-or-none scenario, where the originating wireless subscriber does not have sufficient fund to send the MMS message to all the recipients, the whole Group Message Transfer is rejected and no MMS message is delivered to any of the recipients.

In elucidating further how the improved method and system for Multimedia Messaging Service (MMS) rating and billing handles Group Messages, the following steps should prove illustrative. In the first instance, determine if the incoming Debit Request received from the MMSC belongs to a Group Message by examining the MMSC_NUMBER_OF_RECIPIENTS field. Where the MMSC_NUMBER_OF_RECIPIENTS is greater than 1, the Debit Request is for Group Messaging. Next confirm if the Debit Request is for the first recipient by searching corresponding MMSC_A_MSISDN and MMSC_MSG_ID in the Group Message Store. The Group Message Store holds all outstanding Group Message information which includes, but need not be bounded by, MMSC_A_MSISDN, MMSC_MSG_ID, MMSC_NUMBER_OF_RECIPIENTS, number of processed recipients, each recipient's information (B-Party Address and Service Type), balance, total rate, SCP ID.

Where the Debit Request is for the first recipient, an LDAP subscriber query on A-Party will be performed and a new Group Message entry will be created in the Group Message Store. In addition, the logic of the invention can be articulated to perform a balance query to SCP on the first recipient message, a BalQ will be triggered to the Open Charging (OC) middleware platform and gateway system and the subscriber balance will be returned. Otherwise, a configurable fixed balance will be used instead. Members skilled in the art will recognize that the invention of present need not be limited to the aforementioned Open Charging (OC) middleware platform and gateway system and other similar network implementations for balance queries may be employed without diluting the intent and scope as such.

Next, the art of the invention performs an LDAP subscriber query on B-Party address (if it is a National number), rates the message, and subtracts the amount from the balance. Next, an update is performed to the corresponding Group Message entry with the Total Rate and B-Party information. Where the Total Rate exceeds Balance, the invention clears the corresponding Group Message entry and sends a warning message (where configured by a member skilled in the art) to A-Party. Also, a Debit Response with status code 0x6000 (insufficient funds) will be sent back to MMSC via the original node. Credit Requests may then be triggered by the MMSC to refund a charge for each recipient and should all be positively acknowledged.

If the Debit Request is not for the last recipient and the Total Rate does not exceed Balance, the invention positively acknowledges the Debit Request to MMSC via the original node. Whereas, where the Debit Request is for the last recipient, another balance query is performed by triggering an Open Charging (OC) middleware platform and gateway system as detailed in patent application Ser. No. 10/307,335, as to minimize the fault window. If the Total Rate exceeds the new Balance, a warning message (where configured by a member skilled in the art) is sent to A-Party and a Debit Response with status code 0x6000 (insufficient funds) will be sent back to MMSC via the original node. Otherwise, the logic of the invention positively acknowledges the Debit Request to MMSC via the original node and then performs a sequence of BalDeduct (for each recipient) to the Open Charging (OC) middleware platform and gateway system to debit the wireless subscriber. The corresponding Group Message entry is cleared afterwards.

The computer program product which implements the improved method and system for Multimedia Messaging Service (MMS) rating and billing, has been articulated as to store Group Message entries (then 'Group Message Store'), and will allow said messages to expire and eliminated after a configurable time period. This functionality and implementation is intended to deal with scenarios as MMSC node failures and related exceptions.

In alternate embodiments, the improved method and system for Multimedia Messaging Service (MMS) rating and billing may send a warning message to a prepaid wireless subscriber where said subscriber has an insufficient balance to send a Mobile Originated message. This applies to Single Recipient MMS messages (when debit fails) and Group Messages (when balance falls below 0 or debit fails). The content of the warning message remains entirely configurable (e.g. "Sorry you have insufficient funds. Please try again and thank you for playing"). The message is limited to a single SM.

What is claimed is:

1. A method for real-time multimedia messaging service (MMS) rating and billing comprising:
    receiving a request from a multimedia messaging service center (MMSC) in a multimedia messaging service rating and billing device via a Real Time Payment Protocol (RTPP) interface to rate an MMS message associated with a user account in a service control point;
    determining a rate for the MMS message in dependence on pre-determined rating rules at said multimedia messaging service rating and billing device;
    communicating the determined rate from said multimedia messaging service rating and billing device to an open charging middleware platform which mediates with said user account of said service control point in order to perform a balance deduct function;
    receiving a communication from the open charging middleware platform in said multimedia messaging service rating and billing device indicating a success or failure in charging the determined rate to the user account; and
    communicating a response from said multimedia messaging service rating and billing device to the multimedia messaging service center (MMSC) via said Real Time Payment Protocol (RTPP) indicating, in dependence on the communication received from the open charging middleware platform, the success or failure in charging the user account.

2. The method of claim 1, including receiving the response at the multimedia messaging service center (MMSC) and, in the event that the response indicates a success in charging the user account, sending the MMS Message from the multimedia messaging service center (MMSC) to a recipient.

3. The method of claim 1, including receiving the response at the multimedia messaging service center (MMSC) and, in the event that the response indicates a failure in charging the user account, sending a failure notification from the multimedia messaging service center (MMSC) to the sender of the MMS message.

4. The method of claim 1 wherein the rating rules specify rates based on at least one of the following: size of the MMS Message; day of the week on which the MMS Message is sent; time of day during which the MMS Message is sent; a rate plan of a sender of the MMS Message; and a rate plan of a target recipient of the MMS Message.

5. The method of claim 1 including, prior to communicating the determined rate to the open charging middleware platform, accessing a subscriber database to determine if a determined rate should be communicated to the open charging middleware platform, and if not, then forgoing communicating a determined rate to the open charging middleware platform.

6. The method of claim 5 wherein the determination of whether a determined rate should be communicated to the open charging middleware platform is based on information in the subscriber database about at least one of a sender and a target recipient of the MMS Message.

7. The method of claim 5 wherein when a determination is made to not communicate the determined rate to the open charging middleware platform, the response communicated to the multimedia messaging service center (MMSC) indicates a success in charging the user account.

8. The method of claim 1 wherein determining a rate for the MMS Message includes accessing a subscriber database for information about at least one of a sender and a target recipient of the MMS Message.

9. The method of claim 1 wherein the request received from a multimedia messaging service center (MMSC) is a debit request.

10. A system for real-time multimedia messaging service (MMS) rating and billing device comprising:
a multimedia messaging service center (MMSC);
a multimedia messaging service (MMS) rating and billing device connected to said multimedia messaging service center (MMSC); said multimedia messaging service (MMS) rating and billing device configured to interface with said multimedia messaging service center (MMSC); said multimedia messaging service (MMS) rating and billing device further configured to receive requests from the multimedia messaging service center (MMSC) to rate a user an MMS message associated with a user account;
an open charging middleware platform connected to said multimedia messaging service (MMS) rating and billing device; said multimedia messaging service (MMS) rating and billing device further configured for interfacing with said open charging middleware platform;
a service control point associated with said user account and connected to said open charging middleware platform; said multimedia messaging service (MMS) rating and billing device configured to determine a rate for the MMS message in dependence on pre-determined rating rules and to communicate the determined rate to the open charging middleware platform; said multimedia messaging service (MMS) rating and billing device further configured to receive a communication from the open charging middleware platform indicating a success or failure in charging the user account the determined rate and to communicate a response to the multimedia messaging service center (MMSC) indicating, in dependence on the communication received from the open charging middleware platform, the success or failure in charging the user account.

11. The system of claim 10 wherein the rating rules specify rates based on at least one of the following: size of the MMS Message; day of the week on which the MMS Message is sent; time of day during which the MMS Message is sent; a rate plan of a sender of the MMS Message; and a rate plan of the target recipient of the MMS Message.

12. The system of claim 10 wherein the multimedia messaging service (MMS) rating and billing device is configured to access a subscriber database retrieve information on either the sender or target recipient of the MMS Message.

13. The system of claim 12 wherein the information retrieved from the subscriber database includes rating information about at least one of a sender and a target recipient of the MMS Message or whether the open charging middleware platform is required to be notified of a debit request.

14. A non-transitory computer readable medium encoded with instructions capable of being executed by a computer for performing the method comprising:
receiving a request from a multimedia messaging service center (MMSC) in a multimedia messaging service rating and billing device via a Real Time Payment Protocol (RTPP) interface to rate an MMS message associated with a user account in a service control point;
determining a rate for the MMS message in dependence on pre-determined rating rules at said multimedia messaging service rating and billing device;
communicating the determined rate from said multimedia messaging service rating and billing device to an open charging middleware platform which mediates with said user account of said service control point in order to perform a balance deduct function;
receiving a communication from the open charging middleware platform in said multimedia messaging service rating and billing device indicating a success or failure in charging the determined rate to the user account; and
communicating a response from said multimedia messaging service rating and billing device to the multimedia messaging service center (MMSC) via said Real Time Payment Protocol (RTPP) indicating, in dependence on the communication received from the open charging middleware platform, the success or failure in charging the user account.

15. The non-transitory computer readable medium of claim 14 wherein the rating rules specify rates based on at least one of the following: size of the MMS Message; day of the week on which the MMS Message is sent; time of day during which the MMS Message is sent; a rate plan of a sender of the MMS Message; and a rate plan of a target recipient of the MMS Message.

16. The non-transitory computer readable medium of claim 14 wherein the instructions for, prior to communicating the determined rate to the open charging middleware platform, accessing a subscriber database to determine if a determined rate should be communicated to the open charging middleware platform, and if not, then forgoing communicating a determined rate to the open charging middleware platform.

17. The non-transitory computer readable medium of claim 16 wherein the determination of whether a determined rate should be communicated to the open charging middleware platform is based on information in the subscriber database about at least one of a sender and a target recipient of the MMS Message.

* * * * *